United States Patent [19]
Fuchs et al.

[11] Patent Number: 5,879,617
[45] Date of Patent: Mar. 9, 1999

[54] APPARATUS FOR TREATING WASTE MATERIALS

[75] Inventors: Reinhard Fuchs, Wassenberg; Ewald Feuerstacke, Dorsten, both of Germany

[73] Assignee: Mannesmann Aktiengesellschaft, Düsseldorf, Germany

[21] Appl. No.: 736,780

[22] Filed: Oct. 25, 1996

[30] Foreign Application Priority Data

Oct. 25, 1995 [DE] Germany ............... 195 41 150.1

[51] Int. Cl.⁶ .................................................. C21C 5/52
[52] U.S. Cl. ...................... 266/89; 266/205; 266/217; 266/241; 266/901; 373/81
[58] Field of Search ............... 266/200, 901, 266/205, 217, 241, 89; 75/414; 373/81

[56] References Cited

U.S. PATENT DOCUMENTS

| | | | |
|---|---|---|---|
| 3,812,620 | 5/1974 | Titus et al. | 75/414 |
| 4,199,350 | 4/1980 | Kutscher et al. | 75/10.64 |
| 5,445,363 | 8/1995 | Becerra-Novoa et al. | 266/195 |
| 5,492,309 | 2/1996 | Meierling et al. | 266/901 |
| 5,554,206 | 9/1996 | Czermak et al. | 266/142 |

FOREIGN PATENT DOCUMENTS

| | | |
|---|---|---|
| 05 21 844 | 1/1993 | European Pat. Off. . |
| 44 07 861 | 6/1995 | Germany . |
| WO 94/103 48 | 5/1994 | WIPO . |

*Primary Examiner*—Melvyn Andrews
*Attorney, Agent, or Firm*—Cohen, Pontani, Lieberman & Pavane

[57] ABSTRACT

A method and apparatus for treating residual or waste materials that can be recycled energetically, especially lightweight refuse from shredders, which, reduced in size and classified, are stored in bunkers. The residual or waste material is fed by portions from the bunkers to a supply trough in a metal melting furnace, especially an electric arc furnace for melting steel. After a predetermined time, the residual material is placed by portions into a sluice that can be closed in a gas-tight manner. After the sluice is closed, the residual material is subjected to an oxygen-containing gas, the pressure of which is higher than the pressure at the furnace head of the metal melting furnace, until the pressure within the sluice exceed the pressure in the furnace head. The sluice output opening facing toward the furnace vessel bottom is opened after the pressure within the sluice exceeds the pressure in the furnace head and the residual material is conveyed pneumatically into the chamber part. Nozzles in the chamber part inject oxygen into the shaft to encourage combustion and to assist the acceleration of the residual or waste material through the chamber and into the bottom area of the furnace. The residual material is then submerged in the metal melt located in the bottom area of the metal melting furnace for complete conversion or incineration.

8 Claims, 2 Drawing Sheets

APPARATUS FOR TREATING WASTE MATERIALS

BACKGROUND OF THE INVENTION

1. Field of the Invention

The present invention relates to a method and apparatus for treating waste or residual materials which can be utilized energetically, and more particularly to a method and apparatus for treating refuse from light-duty shredders, which, having been reduced in size and classified, are stored in bunkers and fed into an electric arc furnace for incineration.

2. Description of the Related Art

In processing consumer goods, it is desirable to produce the smallest possible quantity of residue or waste. It is further desirable to produce waste that can be disposed of easily. The objective is, if possible, to process residues or wastes in such a way that increasingly large quantities can be recycled.

Special requirements are posed in recycling used automobiles, for example. Compared to discarded machinery and equipment from old industrial sites, ships and railroad facilities, used automobiles contain an especially high percentage of non-metallic materials such as plastic, glass, rubber, textiles, lacquer, oil and grease, along with metal coatings such as tin and zinc, and non-ferrous metal components such as cobalt, copper and chrome. In standard processing aggregates, i.e. shears, presses and shredders, it is possible to deliberately produce particular bulk densities of recyclable material.

One method of processing a given portion of residue or waste containing a percentage of lighter-weight shredder residue is to produce a plastic granulate and inject the granulate into a blast furnace or cupola furnace. When this is done, the portion of the residue making up the percentage of lighter-weight shredder residue or waste material must first be ground at high expense into a granule smaller than 4 mm. The plastic portion of the residue or waste must then be separated out and injected in the area of the blast-tuyere level of a blast furnace at temperatures of approximately 2000° C. This method is not only expensive, but also recycles only a relatively small portion of residual materials.

SUMMARY OF THE INVENTION

It is accordingly an object of the present invention to provide a method and apparatus for treating residual or waste materials, wherein slightly processed material is completely burned or slagged in an economical and energy-saving fashion using simple structural means.

According to the present invention, residual or waste material such as for example, light-weight refuse from shredders, is stored in bunkers without having to undergo further size reduction in a classifier, e.g., an air classifier. The stored waste is then fed from the bunker, by portions, to a supply trough located inside a metal melting furnace. The granule size and density of the residual material depend only on its composition. It is thus possible to process a desired composition simply by deliberately mixing residual materials from different bunkers, i.e. residual material of various sizes.

The furnace includes a chamber which comprises a sluice and a chamber part. The sluice has input and output openings with the supply trough being connected to the input opening. The residual or waste material is introduced into the sluice through the input opening after a predeterminable time, e.g. the time required for a desired amount of residual or waste material to collect in the supply trough. After the sluice inputs and/or outputs are closed, an oxygen-containing gas is injected into the sluice. The quantity of gas and thus its pressure is controlled in such a manner that the pressure of the oxygen-containing gas is higher than the gas pressure in the melting furnace. The output opening of the sluice is directed toward the chamber part of the chamber in the furnace. The chamber part is open on one side toward the bottom region or furnace area of the furnace wherein a metal melt or bath is located. When the output opening of the sluice is opened, the light-weight refuse is conveyed pneumatically into the chamber part. Substantially accelerated by the pneumatic conveying, the light-weight refuse passes out of the chamber part and into the bottom area of the furnace and encounters the metal melt or bath and submerges into it.

In an advantageous embodiment, scrap is mixed with the residual or waste material. The scrap ensures that the residual or waste material slips or submerges reliably into the bath and thus guarantees its complete conversion or incineration in this region of the furnace.

In a further embodiment of the invention, nozzles are arranged laterally in the chamber part. The nozzles further encourage the movement of the light-weight refuse or the material mixture toward the furnace area or bottom area of the furnace and at the same time supply the oxygen required for combustion.

In a preferred embodiment, an electric arc furnace is used as the device to treat the residual or waste materials. The furnace has a centrally-located electrode and a sleeve-type charging area that surrounds the electrode. In the charging area of the furnace, there is a chamber that extends from the furnace head to the vicinity of the furnace bottom. Part of the chamber is designed as a sluice that can be closed at its inputs and/or outputs by blocking mechanisms and is attached to a gas conveying station. In one embodiment, the chamber is designed as a tube; this chamber forms at least one segment of the sleeve-type charging area. In another preferred embodiment, the chamber is a sleeve-type tube arranged coaxial to the sleeve-type charging area that surrounds the electrode.

The proposed metal melting furnace, i.e. the electric arc furnace, forms a closed system, in which all of the input materials, including the residual or waste materials, are encompassed. Volatile and gaseous compounds are completely encompassed, particularly during the treatment process, and do not cause environmental pollution. Furthermore, the energy conversion of the residual or waste materials in the melting area into heat energy saves electric energy which would otherwise be required to process the waste material.

To increase the serviceable life of the chamber wall of the furnace, it is proposed that the wall be designed as a cooling element and located in an area generally located toward the furnace bottom.

In an advantageous embodiment of the invention, nozzles to inject oxygen and/or burners to apply extreme heat energy are provided below the sluice, preferably in the vicinity of the bath. This ensures the complete combustion of the material in this zone. The burners ensure that the zone is kept free of scrap parts fed from the side and that the desired zone temperature is maintained. In a particularly preferred embodiment, the burners are connected to a fuel conveying station which supplies oil to fuel an oil flame at the burner.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
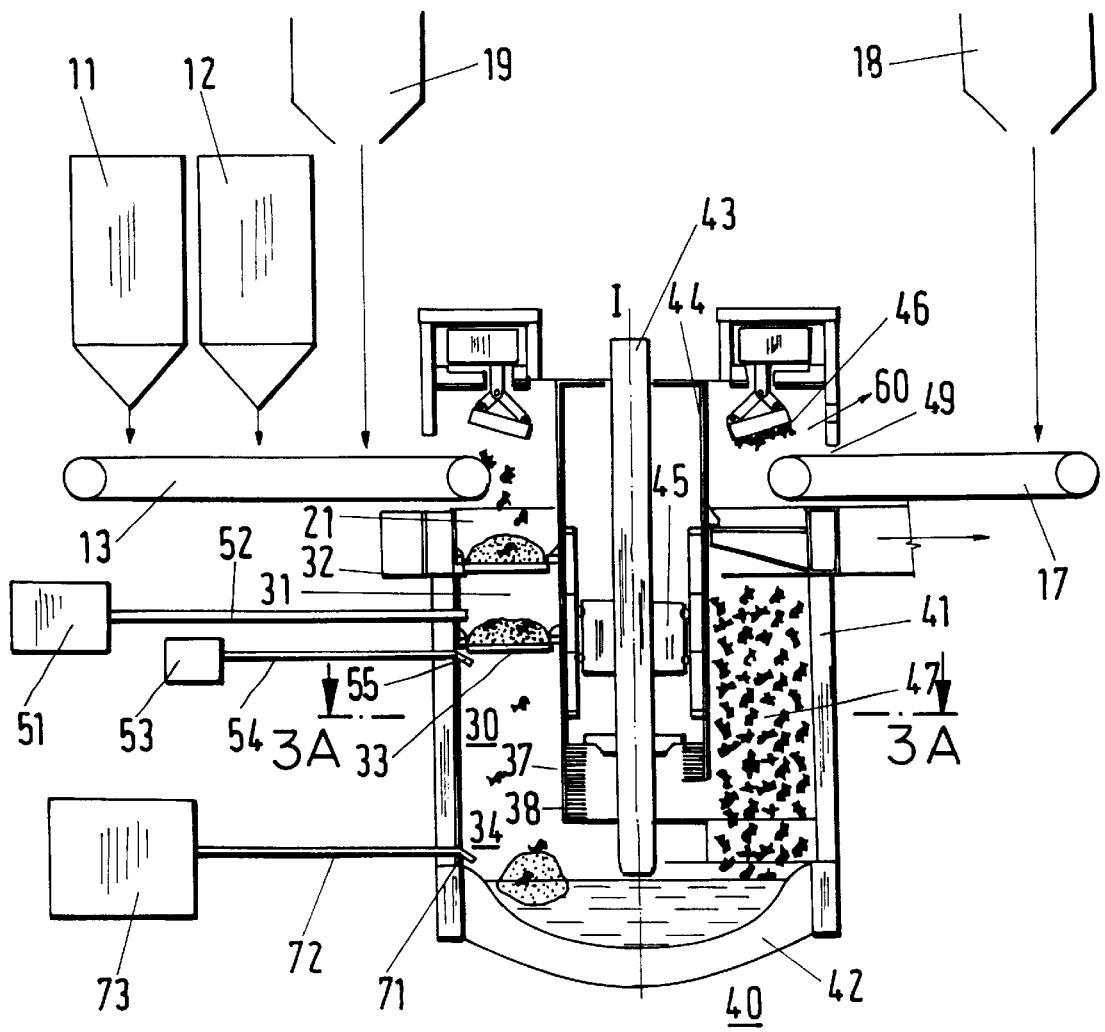
FIG. 1 is a cross-sectional view of an electric arc furnace having a tube-type chamber in the charging area.
Figure 2:
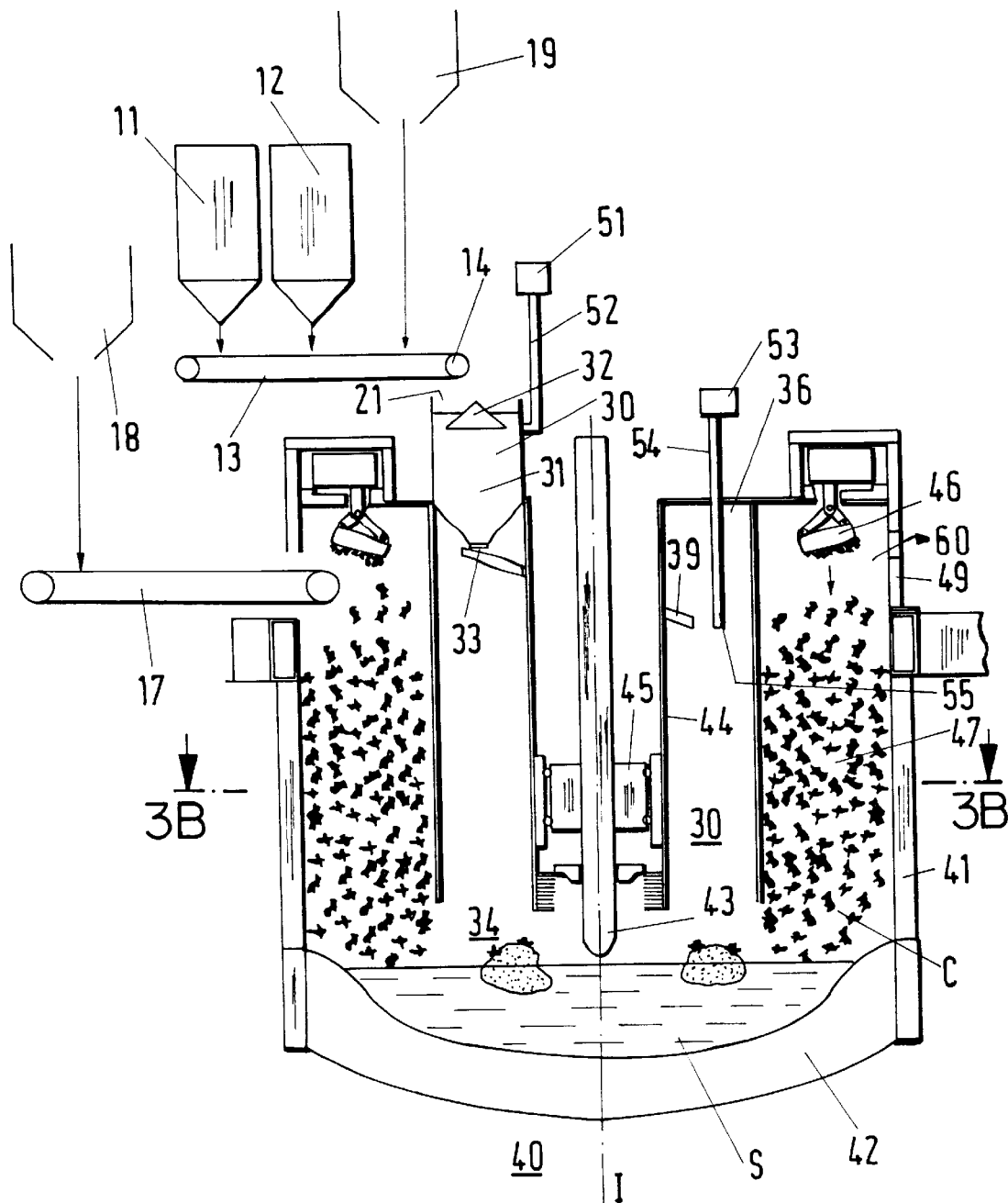
FIG. 2 is a cross-sectional view of an electric arc furnace having a sleeve-type chamber in the charging area.

Referring now to the figures, FIGS. 1 and 2 show bunkers 11 and 12, from which residual or waste material, e.g. light-weight shredder refuse, is placed onto a transport belt 13 and is transported into an electric arc furnace 40. Scrap material from a bunker 19 can be placed onto the transport belt 13 as a supplement to the waste or residual material from bunkers 11 and 12.

The electric arc furnace 40 has a furnace vessel 41 having a vessel bottom 42 and a furnace head 49 having an annular transport path 46 defined thereon. A sleeve-like charging area 47 is disposed within the furnace vessel 41 and includes a charge C contained therein. Annular transport path 46 may be used to carry and deposit the charge C into the charging area 47. The furnace head 49 is connected to a gas purification unit 60 which does not comprise a part of the present invention and is therefore not shown in detail. An electrode 43 held by an electrode holder 45 extends from an electrode sleeve 44 in the furnace vessel 41. A melt S is located in the area of the vessel bottom 42.

Figures 3A, 3B:
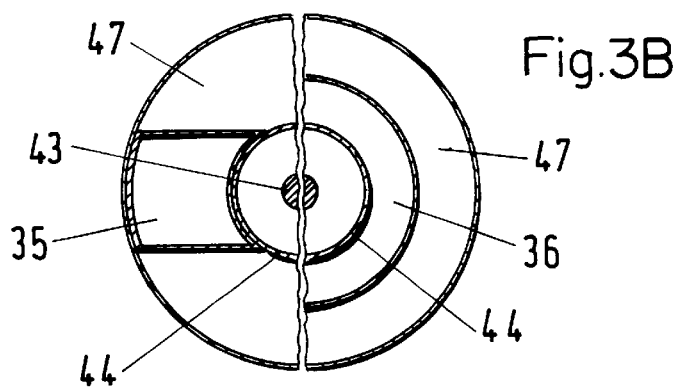
FIG. 3 is a cross-sectional view taken along the line A—A of FIG. 1 and the line B—B of FIG. 2 showing the shape of the respective chambers and charging areas.

In the sleeve-like charging area 47 of FIG. 1, there is a chamber 30, which is embodied as a tubular segment 35 (see also FIG. 3, Section A—A). An upper part of the chamber 30 inclines toward the transport belt 13 and is embodied as a supply trough 21. A part of the chamber 30 disposed below and connected to the supply trough 21 is embodied as a sluice 31, which has a blocking mechanism 32 at a material input location and a blocking mechanism 33 at a material output location. In FIG. 1, the blocking mechanisms 32, 33 are embodied as flaps.

The sluice 31 is connected via a supply line 52 to a gas conveying station 51. In a preferred embodiment, the gas conveyed is primarily air. Blocking mechanisms 32 and 33 can seal the sluice 31 in a gas-tight manner to allow for the injection of gas from the conveying station 51. It is possible to inject gas into the sluice 31 at sufficient pressure so as to raise the pressure within the sluice 31 above the ambient pressure in the furnace head 49.

The chamber 30 includes a chamber part 34 in which nozzles 55 extend inward toward the sluice 31 and are pointed in a substantially downward direction. The nozzles 55 are connected via a supply line 54 to a gas conveying device 53. In a preferred embodiment, the gas conveyed is substantially oxygen.

Residual or waste material is transported through the furnace in a substantially downward direction from the transport belt 13, onto the supply trough 21, through the chamber 30 including the sluice 31 and the chamber part 34, and into the melt S in the furnace vessel bottom 42.

Below the sluice 31, burners 71 are provided at the output of chamber 30 in the chamber part 34. The burners 71 are connected via a supply line 72 to a fuel conveying station 73. In a preferred embodiment, the fuel station 73 supplies oil to the burners 71 to fuel an oil flame.

A wall 37 of the chamber part 34 is located below the sluice 31 and is provided with cooling ducts 38 that are connected to a cooling device. The cooling device does not comprise a part of the present invention and therefore is not shown in greater detail.

View A—A of FIG. 3 shows the location of tubular segment 35 within the sleeve-like charging area 47.

Referring now to FIG. 2, the discharge point of the transport belt 13 is marked by reference number 14. The furnace has a main axis I and a supply trough 21 which is arranged concentric thereto. The bottom of supply trough 21 can be closed by a blocking mechanism 32. In a particularly preferred embodiment, the blocking mechanism 32 is bell-shaped. The blocking mechanism 32 comprises the upper portion of a cylindrical sluice 31, which has a blocking mechanism 33 at its material output location. Arranged below the sluice 31 is a rotary chute 39, by means of which the light-weight refuse can be supplied to a sleeve-like chamber part 36.

In the embodiment of FIG. 2, the chamber 30 is embodied as a sleeve-like chamber part 36 and comprises a cylindrical sluice 31. The sluice 31 is connected via a supply line 52 to a gas conveying station 51. In a preferred embodiment, the gas conveyed is substantially air. In the sleeve-like chamber part 36 there extends a nozzle 55, which is connected via a supply line 54 to a gas conveying station 53. In a preferred embodiment, the gas conveyed is substantially oxygen.

View B—B in FIG. 3 shows the sleeve-like chamber part 36 located between the electrode sleeve 44 and the sleeve-like charging area 47.

In operation, residual or waste material of various sizes is stored in bunkers 11 and 12. Controllable quantities of the residual or waste material is dispensed from the bunker 11 or 12 to a transport belt 13 which transports the material to a supply trough 21 inside the furnace 40. Bunkers 18 and 19 contain scrap material which can be added to the residual or waste material during transport on the transport belt 13 prior to delivery to the supply trough 21. The addition of scrap material ensures that the residual or waste material submerges reliably into the bath at the furnace bottom thereby guaranteeing complete conversion or incineration of the residual or waste material. The granule size and density of the residual or waste material to be processed depends only on the composition of the material dispersed from the bunkers 11, 12. It is therefore possible to deliver residual or waste material to the furnace of a desired composition by merely mixing material from a variety of bunkers. Charge C may be introduced into the sleeve-like charging area 47 by means of the annular transport path 46 to further encourage incineration. From the supply trough 21, the residual or waste material is introduced into the sluice 31, which is connected to the supply trough 21. The sluice 31 is gas-tightly closable and has an input opening facing the supply trough 21 and an output opening facing the melt S located in the area of the vessel bottom 42. The input opening is sealable by blocking mechanism 32 and the output opening is sealable by blocking mechanism 33. In a preferred embodiment, the blocking mechanisms 32, 33 are embodied as flaps. In an alternative embodiment, the input blocking mechanism 32 is bell-shaped. Once the desired quantity of residual or waste material is collected in the trough 21, it passes into the sluice 31 which is then sealed in a gas-tight manner. An oxygen-containing gas is then injected into the sluice 31. In a preferred embodiment, air is injected into the sluice 31. The quantity of gas injected is controlled such that the pressure of the injected gas is greater than the ambient gas pressure in the furnace head 49. When the pressure within the gas-tightly sealed sluice 31 exceeds the ambient pressure in the furnace head 49, the blocking mechanism 33 at the output opening is opened and the residual or waste material passes pneumatically into the chamber part 34. The light-weight residual or waste material is accelerated through the chamber part 34 by the pneumatic conveyance and thus encounters the metal melt located in the bottom region of the furnace 40 and submerges into it. In a preferred embodiment, nozzles 55 extend into the chamber part 34 below the output opening of the sluice 31. The nozzles 55 convey a gas, preferably oxygen, into the chamber part 34 in the direction of material transport and serve to further accelerate the movement of the light-weight residual or waste material. The use of oxygen also encourages combustion in the chamber 30. Burners 71 are provided below the sluice 31 at the output of the chamber part 34 to ensure that the chamber part 34 is kept free of scrap parts which may be introduced. Burners 71 also maintain a desired temperature in the vessel bottom 42.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An apparatus for treating a light-weight residual material comprising:

an electric arc furnace for melting metal, said furnace comprising a supply trough, a gas-tightly closable sluice having an input opening connected to said supply trough and an output opening, a furnace top area adapted to be operated at a pressure, and a bottom area for containing melted metal;

means for feeding the residual material to said supply trough in said furnace;

means located in said furnace top area for transporting the residual material from said supply trough through said input opening into said sluice;

means for closing said sluice in a gas-tight fashion, said means comprising a flap disposed at said sluice opening and being operable for gas-tightly sealing said sluice input opening;

means for subjecting the residual material within said sluice to an oxygen-containing gas at a pressure greater than the pressure present at said furnace top area until the pressure within said sluice reaches a pressure level exceeding the pressure present at said furnace top area, said means comprising a gas conveying source connected to said sluice; and means for opening said sluice output opening after the pressure within said sluice reaches said pressure level to pneumatically convey the residual material into said bottom area and to submerge the residual material into the melted metal located in said bottom area, said opening means comprising a flap disposed at said sluice output opening.

2. An apparatus for treating light-weight residual material comprising:

a metal melting electric arc furnace having a furnace vessel having a bottom, a furnace top area and a substantially cylindrical charging area disposed therebetween and within said furnace vessel;

an electrode centrally located within said charging area and encompassed thereby; and a chamber extending from said furnace top area to said vessel bottom and having a chamber output, said chamber further comprising a sluice having an input opening for receiving the residual material and an output opening and having closing mechanisms at said input and output openings; and a conveying gas inlet attached to said sluice;

said furnace further comprising a supply tough disposed above said chamber for holding the residual material before it is received by said sluice, the residual material moving through said furnace in a material transport direction defined as generally downward from said supply trough and towards said vessel bottom.

3. The apparatus of claim 2, wherein said furnace has a main axis and wherein said chamber is substantially cylindrical and further comprises a chamber part forming a part of said charging area and is arranged coaxial with said main axis.

4. The apparatus of claim 2, wherein said chamber further comprises:

a chamber part arranged below said sluice in said material transport direction; and a sleeve surrounding said electrode adjacent said chamber part and extending substantially between said furnace top area and said vessel bottom;

said chamber part being substantially cylindrical and arranged coaxially between said sleeve and said charging area.

5. The apparatus of claim 3, wherein said chamber further comprises a wall comprising a cooling element and located in the area of said vessel bottom.

6. The apparatus of claim 5, wherein said cooling element further comprises a plurality of ducts for passing a liquid cooling medium therethrough.

7. The apparatus of claim 5, wherein said furnace further comprises a plurality of nozzles for injecting an oxygen-containing gas into said chamber part, said plurality of nozzles being provided below said sluice in said material transport direction.

8. The apparatus of claim 2, further comprising:

an energy burner provided below said sluice at said chamber output for providing external heat energy to said charging area;

a fuel conveying station; and a supply line connected between said energy burner and said fuel conveying station.

* * * * *